(12) United States Patent
Strom et al.

(10) Patent No.: US 9,330,282 B2
(45) Date of Patent: May 3, 2016

(54) INSTRUCTION CARDS FOR STORAGE DEVICES

(75) Inventors: Marius Strom, Bellevue, WA (US); Sompong Paul Olarig, Pleasanton, CA (US); Chris Lionetti, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 327 days.

(21) Appl. No.: 12/481,806

(22) Filed: Jun. 10, 2009

(65) Prior Publication Data

US 2010/0318810 A1    Dec. 16, 2010

(51) Int. Cl.
G06F 11/30    (2006.01)
G06F 21/80    (2013.01)
G06F 21/79    (2013.01)

(52) U.S. Cl.
CPC ............... *G06F 21/80* (2013.01); *G06F 21/79* (2013.01); *G06F 2221/2143* (2013.01)

(58) Field of Classification Search
CPC ... H04N 1/00938; G06F 9/445; G06F 9/4451; G06F 9/44584; G06F 2009/445
USPC ......................................................... 713/193
See application file for complete search history.

(56) References Cited

U.S. PATENT DOCUMENTS

| 5,857,020 | A | 1/1999 | Peterson, Jr. |
| 6,067,620 | A | 5/2000 | Holden et al. |
| 6,351,813 | B1 | 2/2002 | Mooney et al. |
| 6,408,388 | B1 | 6/2002 | Fischer |
| 6,434,700 | B1 | 8/2002 | Alonso et al. |
| 6,813,709 | B1 | 11/2004 | Benardeau |
| 6,963,890 | B2 | 11/2005 | ***Dutta |
| 6,963,980 | B1 | 11/2005 | Mattsson |
| 6,970,817 | B2 | 11/2005 | Ross et al. |
| 6,993,618 | B2 * | 1/2006 | Chen et al. ..................... 710/305 |

(Continued)

FOREIGN PATENT DOCUMENTS

| CN | 101017464 A | 8/2007 |
| EP | 1551149 A2 | 7/2005 |

(Continued)

OTHER PUBLICATIONS

Olarig, et al., "Hardware Encrypting Storage Device With Physically Separable Key Storage Device", U.S. Appl. No. 12/356326, filed Jan. 20, 2009.

(Continued)

*Primary Examiner* — Esther B Henderson
(74) *Attorney, Agent, or Firm* — Henry Gabryjelski; Kate Drakos; Micky Minhas (57) ABSTRACT

A card can be communicationally coupled to a storage device. The card can then cause the storage device to perform stand-alone tasks without a computing device. The card can invoke instructions already present in the firmware of the storage device or the card can first copy instructions to the firmware and then invoke them. The card can cause the storage device to perform actions, such as a secure erase, and the storage device can remain inaccessible until such actions are performed, even if power is interrupted. The card can also receive information from the storage devices and then use that information with a new storage device to, for example, enable the new storage device to take the place of, and reconstruct the data of, the old storage device in a storage array directly from other storage devices in the array and without burdening a computing device or array controller.

19 Claims, 7 Drawing Sheets

(56) References Cited

U.S. PATENT DOCUMENTS

| | | |
|---|---|---|
| 7,136,995 B1 | 11/2006 | Wann |
| 7,200,756 B2 | 4/2007 | Griffin et al. |
| 7,375,615 B2 | 5/2008 | Kitagawa et al. |
| 7,418,344 B2 | 8/2008 | Holtzman et al. |
| 7,516,484 B1 | 4/2009 | Arnouse |
| 7,633,375 B2 | 12/2009 | Matsuda et al. |
| 7,706,778 B2 | 4/2010 | Lowe |
| 7,770,018 B2 | 8/2010 | Fiske |
| 7,814,554 B1 | 10/2010 | Ragner |
| 7,860,793 B2 | 12/2010 | Karkanias et al. |
| 7,877,603 B2 | 1/2011 | Goodman et al. |
| 7,886,347 B2 | 2/2011 | Gill et al. |
| 7,987,372 B2 | 7/2011 | Mani |
| 8,078,885 B2 | 12/2011 | Jobmann |
| 8,112,632 B2 | 2/2012 | Bedingfield, Sr. |
| 8,116,455 B1 | 2/2012 | Sussland et al. |
| 2002/0133713 A1 | 9/2002 | Fieschi et al. |
| 2002/0152392 A1 | 10/2002 | Hardy et al. |
| 2003/0046568 A1 | 3/2003 | Riddick et al. |
| 2003/0056096 A1 | 3/2003 | Albert et al. |
| 2003/0065919 A1 | 4/2003 | Albert et al. |
| 2003/0070083 A1 | 4/2003 | Nessler |
| 2003/0117433 A1 | 6/2003 | Milton et al. |
| 2003/0167376 A1 | 9/2003 | Koh |
| 2003/0177363 A1 | 9/2003 | Yokota et al. |
| 2004/0107366 A1 | 6/2004 | Balfanz et al. |
| 2004/0193761 A1 | 9/2004 | Ouchi |
| 2004/0193764 A1 | 9/2004 | Watanabe |
| 2004/0236952 A1 | 11/2004 | Girouard et al. |
| 2005/0047414 A1 | 3/2005 | Terashima et al. |
| 2005/0086493 A1 | 4/2005 | Ishidoshiro |
| 2005/0138389 A1 | 6/2005 | Catherman et al. |
| 2005/0182934 A1* | 8/2005 | Elteto ............ 713/169 |
| 2005/0228958 A1 | 10/2005 | Kawa et al. |
| 2005/0237821 A1 | 10/2005 | Dekker et al. |
| 2005/0244037 A1 | 11/2005 | Chiu et al. |
| 2005/0262361 A1 | 11/2005 | Thibadeau |
| 2005/0268340 A1 | 12/2005 | Schilling |
| 2005/0289646 A1* | 12/2005 | Zimmer et al. ............ 726/9 |
| 2006/0036868 A1 | 2/2006 | Cicchitto |
| 2006/0041934 A1 | 2/2006 | Hetzler |
| 2006/0098405 A1 | 5/2006 | Bloebaum |
| 2006/0123463 A1 | 6/2006 | Yeap et al. |
| 2006/0161790 A1 | 7/2006 | Hunter et al. |
| 2006/0174352 A1 | 8/2006 | Thibadeau |
| 2006/0200865 A1 | 9/2006 | Leake, Jr. et al. |
| 2006/0219776 A1 | 10/2006 | Finn |
| 2006/0236115 A1 | 10/2006 | Haneda |
| 2006/0242423 A1 | 10/2006 | Kussmaul |
| 2006/0259785 A1 | 11/2006 | Thibadeau |
| 2006/0288227 A1 | 12/2006 | Kalofonos et al. |
| 2006/0294388 A1 | 12/2006 | Abraham et al. |
| 2006/0294585 A1 | 12/2006 | Sadovsky et al. |
| 2007/0045417 A1* | 3/2007 | Tsai et al. ............ 235/441 |
| 2007/0079113 A1 | 4/2007 | Kulkarni et al. |
| 2007/0180493 A1 | 8/2007 | Croft et al. |
| 2007/0214187 A1 | 9/2007 | Thomas et al. |
| 2007/0220269 A1 | 9/2007 | Suzuki |
| 2007/0234037 A1 | 10/2007 | Toda |
| 2007/0234215 A1 | 10/2007 | Graham et al. |
| 2007/0266117 A1 | 11/2007 | Pomies et al. |
| 2007/0266258 A1 | 11/2007 | Brown et al. |
| 2008/0002372 A1 | 1/2008 | Kelso et al. |
| 2008/0005353 A1 | 1/2008 | Panabaker et al. |
| 2008/0010453 A1 | 1/2008 | Hamid |
| 2008/0046751 A1 | 2/2008 | Choi |
| 2008/0052686 A1* | 2/2008 | Jogand-Coulomb et al. . 717/139 |
| 2008/0072071 A1 | 3/2008 | Forehand et al. |
| 2008/0077803 A1 | 3/2008 | Leach et al. |
| 2008/0082813 A1 | 4/2008 | Chow et al. |
| 2008/0114990 A1 | 5/2008 | Hilbert et al. |
| 2008/0120726 A1* | 5/2008 | Tsunehiro et al. ............ 726/27 |
| 2008/0155184 A1 | 6/2008 | Gorobets et al. |
| 2008/0235520 A1 | 9/2008 | Becker et al. |
| 2008/0263305 A1 | 10/2008 | Shu et al. |
| 2008/0281953 A1 | 11/2008 | Blaisbell |
| 2009/0094597 A1* | 4/2009 | Moskalik et al. ............ 717/174 |
| 2009/0196417 A1 | 8/2009 | Beaver et al. |
| 2010/0080387 A1 | 4/2010 | Fan et al. |
| 2010/0185843 A1 | 7/2010 | ***Olarig et al. |
| 2010/0325736 A1 | 12/2010 | ***Sadovsky et al. |
| 2012/0265988 A1 | 10/2012 | Ehrensvard |

FOREIGN PATENT DOCUMENTS

| | | |
|---|---|---|
| JP | 2003316655 A | 11/2003 |
| JP | 2008016001 A | 1/2008 |
| JP | 2009026267 A | 2/2009 |
| KR | 100480998 B1 | 4/2005 |
| KR | 1020080071530 | 8/2008 |

OTHER PUBLICATIONS

"Fortezza Crypto Card Frequently Asked Questions", http://web.archive.org/web/20061117145614/http://www.spyrus.com/support/fortezza_faq.asp.

"HDS Universal Storage Platform With Encryption", http:www.storagenewsletter.com/news/systems/hds-universal-storage-platform-encrypti . . . , Oct. 31, 2008.

Zhu, Yingwu et al., SNARE: A Strong Security Scheme for Network-Attached Storage, 22nd International Symposium on Reliable Distributed Systems (SRDS'03), Oct. 6, 2008.

* cited by examiner

INSTRUCTION CARDS FOR STORAGE DEVICES

BACKGROUND

Increasingly, computing devices are being utilized to operate on, and store, data and information that is meant to be kept private. Such data and information can include governmental secrets, but more likely includes business and personal information that could be damaging to one or more individuals if such information was obtained by a malicious party or an adversarial party. As such, various security mechanisms have been implemented, both in association with the hardware of a computing device and in association with the software of a computing device. Examples of such hardware security mechanisms include peripherals designed to generate secure passwords based on biometric information, such as a fingerprint, and physical access barriers to a computing device, such as keyboard locks, communication port locks, and the like. Examples of security mechanisms associated with the software of a computing device include various encryption technologies and various access control technologies.

However, the protection of data stored on one or more computer-readable media often fails during activity that is not directly associated with a computing device at all. For example, the data stored on one or more computer-readable media can be, and has been, compromised when physical shipments of storage devices, such as hard disk drives, that comprise the computer-readable media have not been properly safeguarded and have, consequently, been lost or even stolen. Similarly, data stored on one or more computer-readable media can be, and has been, compromised when storage devices comprising the computer-readable media have been deemed to have failed and have been, therefore, discarded. Often such "failed" storage devices retain a significantly high percentage of the data stored on their computer-readable media in a form that can be retrieved and accessed by a computing device.

To enhance the protection of data stored on computer-readable media, especially if the storage device comprising such media were to become physically accessible to malicious or adversarial parties, "full volume" encryption methodologies were developed, whereby substantially all of the data stored on the computer-readable storage media of a storage device is stored in an encrypted form such that, even if a malicious or adversarial party were to gain physical control of such a storage device, they would be unlikely to decrypt the data absent an appropriate decryption key. To provide greater performance, the encryption of data being stored on storage devices can be performed by dedicated cryptographic hardware that is part of the storage device itself, rather than by burdening the one or more central processing units of the computing device storing and retrieving such data.

In addition to full-volume encryption methodologies, the physical destruction, in an appropriate manner, of the computer-readable storage media, or the whole storage device, on which sensitive data was stored can likewise enhance the protection and security of such data. For example, computer-readable storage media that may have stored data that is to be protected can be physically shredded or exposed to random, strong, magnetic fields, such that the data is either not physically consistent, or is not physically recoverable from the computer-readable media. Alternatively, rather than physically destroying a storage device, sensitive data stored on a computer-readable storage medium can be overwritten by a computing device in accordance with pre-defined secure erasure policies. Unfortunately, physical destruction of computer-readable storage media and storage devices can be both costly and time-consuming and, as efficiencies are sought to reduce the time and expense, short-cuts that may compromise the protection and destruction of data stored on such media may be employed, thereby undermining the physical destruction efforts. The erasure of sensitive data from computer-readable storage media can be even more time consuming, as such erasure procedures can require the dedicated use of one or more computing devices for hours or days at a time, depending on the quantity of computer-readable storage media that are to be securely erased. Adding further inefficiencies, various regulations, such as governmental security regulations, or privacy regulations, can impose additional burdens, such as the requirement that proper destruction of computer-readable storage media is both undertaken and documented in a particular manner.

SUMMARY

A storage device can comprise, in addition to non-volatile computer-readable storage media, processing units or controllers, and firmware, the ability to be communicationally coupled to a card. The card can be any physical device that can comprise communicational capability, including a plug or socket, for communicating with a storage device, and that can further comprise at least a small amount of computer-readable storage media for storing instructions or data relevant to one or more storage devices to which such a card can be communicationally coupled.

In one embodiment, the communicational coupling of a card to a storage device can cause the storage device to perform one or more actions that are specified by, or otherwise based on, the card to which such a storage device was communicationally coupled. The actions can be performed by the storage device without requiring a further communicational connection to a computing device.

In another embodiment, once a storage device has begun performing actions in response to a card being communicationally coupled with the storage device, the storage device can complete the actions prior to allowing or performing any other action that can access or change the data stored on the storage device. Thus, if power were to be removed from the storage device prior to the completion of the actions, the subsequent reapplication of power would cause the storage device to resume performance of the actions. Similarly, if the card were to be communicationally disconnected from the storage device, the storage device would continue to perform the actions without further communications with the card.

In a further embodiment, a card that is communicationally coupled to a storage device can be utilized by the storage device to store information relevant to the storage device's operations in an array or collection of storage devices. Additionally, the card can comprise instructions for requesting data stored on other storage devices of the array or collection of storage devices. A failure of the storage device can, then, be remedied by communicationally disconnecting the card from the failed storage device and subsequently communicationally coupling the card to an operational storage device. The information and instructions on the card can enable the operational storage device to acquire the data of the failed storage device and assume the failed storage device's place in the array or collection of storage devices.

In a still further embodiment, a card communicationally coupled to a storage device can provide instructions to the storage device. Such instructions can update, or be stored in, the storage device's firmware and can be executed from there.

In a yet further embodiment, a card communicationally coupled to a storage device can invoke pre-existing instructions that are part of the storage device's firmware to cause the storage device to perform specific actions.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

The following descriptions relate to storage devices that can be communicationally coupled to a card, where such a coupling can cause the storage device to perform one or more actions without requiring a communicational connection to a computing device. The communicational coupling of the card to a storage device can cause the storage device to perform actions such as secure erasure routines, formatting routines, maintenance routines, or other such actions. To provide for security and predictability, once the storage device commences performance of the actions, it can proceed to complete such actions prior to performing any other actions that can access or change the data stored on the storage device. Thus, as an example, once the storage device started performing an action, it could resume doing so after a loss of power and a subsequent restoration thereof. The actions performed by the storage device can be performed based on the invocation of instructions already in the storage device's firmware, or based on the invocation of instructions provided by the card. The card can also be utilized for storage of storage device related information, such as, for example, information regarding the storage device's relationship to other storage devices in an array or collection of storage devices. Such a storage device can then be replaced in the array or collection of storage devices by communicationally disconnecting the card from the storage device and subsequently establishing a communicational connection between the card and a replacement storage device.

The techniques described herein focus on, but are not limited to, a storage device that can accept a card physically inserted into a receptacle that is physically part of the storage device. Indeed, the below described mechanisms are equally applicable to any communicational methodology by which the storage device and the card are communicationally coupled. Furthermore, the term "card" is not meant to require a device whose physical dimensions comprise a thickness substantially less than a length and width. To the contrary, as used in the descriptions below, the term "card" means any physical device that comprises communicational capability and the ability to retain and provide, to a storage device, the instructions and information referenced below. Consequently, while the descriptions below are most easily visualized by a storage device that can physically accept a traditional card-shaped device, the descriptions are not so limited.

Additionally, although not required, the descriptions below will be in the general context of computer-executable instructions, such as program modules, being executed by one or more processing units or controllers. More specifically, the descriptions will reference acts and symbolic representations of operations that are performed by one or more processing units or controllers, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the processing units, controllers or other physical components or subsystems connected thereto in a manner well understood by those skilled in the art. The data structures where data is maintained are physical locations that have particular properties defined by the format of the data.

Generally, program modules and instructions include routines, programs, objects, components, data structures, and the like that perform particular tasks or implement particular abstract data types. Moreover, those skilled in the art will appreciate that the processing units and controllers referenced need not be limited to conventional personal computing processing units, and include other processor or controller configurations, including dedicated processors, specific-use processors, communications processors, bus processors and the like often found in storage devices or other peripheral devices, hand-held devices, multi-processor systems, microprocessor based or programmable consumer electronics. Similarly, the storage devices referenced in the below descriptions need not be limited to conventional magnetic-based or solid-state based storage devices and can be any storage device, or arrangement of storage devices that provide for storage of computer-readable instructions or data.

Figure 1:
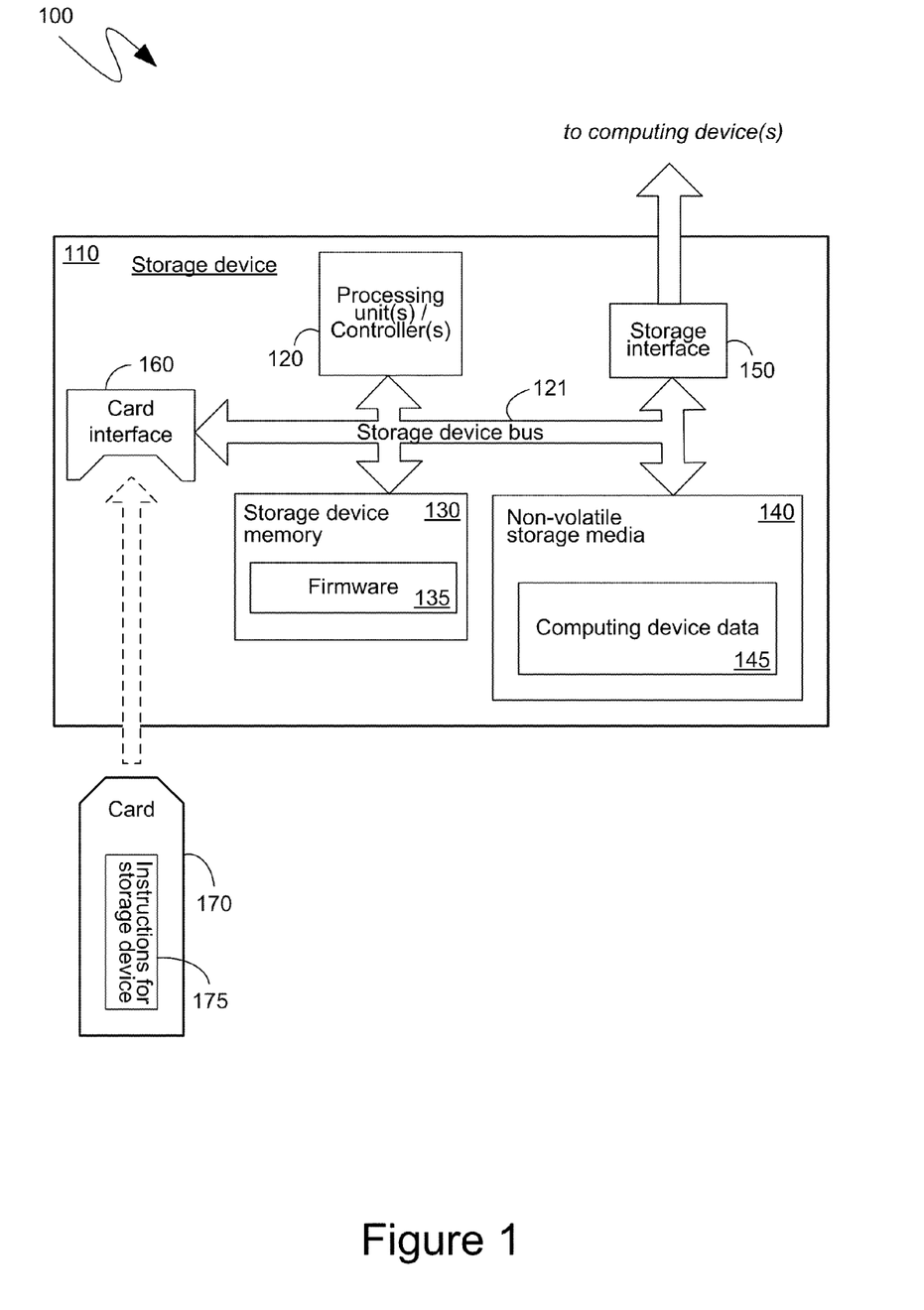
FIG. 1 is a block diagram of an exemplary storage device and an exemplary card.

Turning to FIG. 1, an exemplary storage system 100 is illustrated, comprising an exemplary storage device 110 and an exemplary card 170 that can be communicationally coupled to, or communicationally disconnected from, the storage device 110. Turning first to the exemplary storage device 110, it can include, but is not limited to, one or more processing units or controllers 120, a storage device memory 130 and a storage device bus 121 that couples various system components including the storage device memory 130 to the processing units or controllers 120. Depending on the specific physical implementation, one or more of the processing units or controllers 120 and some or all of the storage device memory 130 can be physically co-located, such as on a single chip. In such a case, some or all of the storage device bus 121 can be nothing more than silicon pathways within a single chip structure and its illustration in FIG. 1 can be strictly notational convenience for the purpose of illustration. Additionally, as used in the descriptions below, the terms "processing unit" and "controller" are synonymous and both refer to a unit that is capable of adjusting its output based on a collection of inputs.

The storage device 110 also typically includes computer readable media, which can include any available media that can be accessed by a computing device and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The storage device memory 130 includes computer storage media in the form of volatile and/or nonvolatile memory such as read only memory or random access memory. The storage device memory 130 can comprise firmware 135 or other instructions capable of execution by the processing units or controllers 120 that can enable the storage device 110 to perform storage device functionality and maintenance.

Typically, the storage device 110 also comprises other removable/non-removable, volatile/nonvolatile computer storage media that can be used with a computing device. The storage device 110 of FIG. 1 is illustrated as comprising non-volatile computer-readable storage media 140 that can provide storage for computing device data 145, which can include computer-readable instructions and computer-readable data. Other storage media that can provide some or all of the storage functionality of a storage device, such as the exemplary storage device 110, can include, but are not limited to, magnetic tape cassettes, flash memory cards, solid state storage devices (SSDs), digital versatile disks, digital video tape, solid state RAM, solid state ROM, and the like.

The storage device 110 traditionally operates in conjunction with one or more computing devices for which the storage device 110 provides storage functionality. Communications between the storage device 110 and such one or more computing device can be performed through a storage interface 150, which can comply with any one or more storage interface specifications for greater compatibility.

Of relevance to the descriptions below, the storage system 100 can further comprise a card 170 that can comprise instructions for a storage device 175 or other instructions or data relevant to the storage device 110. The card 170 is a physical entity that is physically separate, and separable, from the storage device 110. The card 170 is also communicationally connectable and separable from the storage device 110, though a communicational connection does not necessarily require a physical connection, and vice versa. The storage device 110 can further comprise, in addition to the elements described above, a card interface 160 that can be connected to the storage device bus 121, thereby enabling communication between the card interface 160 and the other components of the storage device 110, including, but not limited to, the processing units or controllers 120, the storage device memory 130 and firmware 135.

In one embodiment, the card interface 160 can comprise a physical slot or connector that is compatible with a connector or other physical connecting structure or shape on the card 170 such that the card 170 and the storage device 110 can be communicationally coupled through a physical connection between at least a portion of the card 170 and the card interface 160. In such an embodiment, assuming proper application of power, the physical coupling and decoupling of the storage device 110 and the card 170 can, likewise, result in the communicational connection and disconnection between the storage device 110 and the card 170. Thus, the dashed arrow in FIG. 1 can represent, in such an embodiment, a physical insertion or other physical joining between the card 170 and the card interface 160 of the storage device 110. For manufacturing and fiscal efficiency, the card interface 160 and the card 170 can conform to pre-existing physical standards, such as those applicable to Secure Digital (SD) cards, Compact Flash (CF) cards, Subscriber Identity Module (SIM) cards, USB devices or other like standards.

In another embodiment, however, the card interface 160 can comprise a long-range or short-range wireless communication device such that the card 170 can be communicationally coupled to the storage device 110 through a wireless connection between the card 170 and the card interface 160. For example, the card 170 and the card interface 160 can establish a wireless communicational connection when the card 170 is brought within close proximity, such as a few inches, from the card interface 160. In such an embodiment, a communicational connection between the card 170 and the storage device 110 can be unrelated to any physical connection between the two and, indeed, no such physical connection would be needed to establish or break a communication connection between the card 170 and the storage device 110. Consequently, in such an embodiment, the dashed arrow in FIG. 1 can represent a communicational, and not necessarily physical, connection between the card 170 and the card interface 160.

Figure 2:
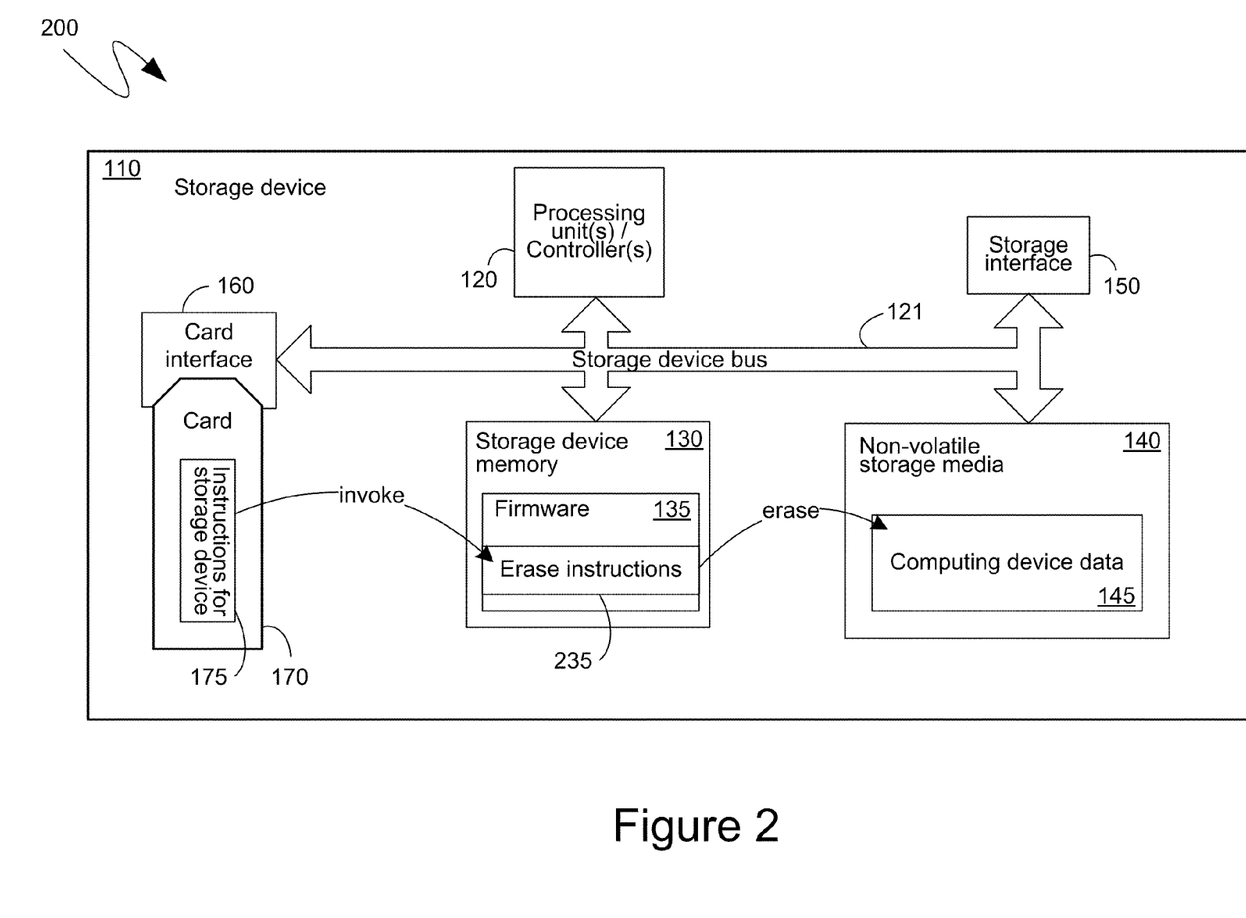
FIG. 2 is a block diagram of an exemplary operation of a storage device and a card communicationally coupled thereto.

Turning to FIG. 2, a storage system 200 is illustrated in which the card 170 is communicationally coupled to the card interface 160. For ease of illustration, such a communicational coupling is illustrated as a physical coupling between the two. However, as explained above, such a physical connection is not required by the mechanisms described.

As shown in the storage system 200, the communicational coupling of the card 170 to the card interface 160 of the storage device 110 can enable the instructions 175 of the card to invoke specific instructions of the storage device 110, such as may be stored, or otherwise be part of, the firmware 135 of the storage device. In the illustrated embodiment, erase instructions 235 can be part of the firmware 135 of the storage device 110. The erase instructions 235 can enable the storage device 110 to erase data 145 stored on its non-volatile storage media. For example, the erase instructions 235 can conform to various secure erase protocols, such as by erasing the data 145 multiple times, or writing random data across the non-volatile storage media 140 multiple times or in a particular fashion.

When the card 170 is communicationally coupled to the storage device 110, the instructions 175 that can be present on the card 170 can invoke the erase instructions 235 of the firmware 135, such as through signals carried by the card interface 160 and the storage device bus 121 to the appropriate locations within the storage device memory 130 where the firmware 135 and, more specifically, the erase instructions 235, reside. Subsequently, upon invocation by the instructions 175 of the card 170, the erase instructions 235 can proceed to be executed by the processing units or controllers 120 of the storage device 110 and can erase the data 145 stored on the non-volatile storage media 140 in accordance with the erasure protocols with which the erase instructions 235 were provisioned.

While the storage device 110 can be supplied with power needed to operate in order to perform the functions described, in one embodiment the storage device 110 need not be communicationally coupled to a computing device. Thus, a storage device, such as the storage device 110, can be communicationally disconnected from a computing device, such as through a physical removal of the storage device from the computing device, and can, subsequently, be instructed to erase itself securely merely through the establishment of a communicational connection between a card, such as the card 170, and the storage device. The computing device to which the storage device was previously communicationally coupled does not, in such an embodiment, need to be utilized to perform the secure erasure of the storage device, and can, instead, be allocated to other tasks. As a result, a collection of storage devices, analogous to the storage device 110, can be securely erased by, for example, inserting a card 170 into each storage device and then letting the storage device erase itself, without any of those storage devices requiring any attention from, or a communicational connection to, a computing device.

To provide security, in one embodiment, the invocation of instructions, such as the erase instructions 235, by the communicational coupling of a card 170 to the storage device 110 can cause the storage device 110 to not perform any other action that can access or change the data stored on the storage device, until the execution of the invoked instructions is completed. In such an embodiment, the execution of the invoked instructions can be the only action directed to data storage that the storage device will perform until such execution is complete. Therefore, if, for example, the application of power to the storage device 110 was terminated prior to the completion of the erase instructions' execution, some of the data 145 may remain on the storage media 140. Consequently, for security, upon the reapplication of power to the storage device 110, the storage device could not perform any other action that can access or change the data stored on the storage device, such as reading the data or writing new data, until the completion of the execution of the invoked erase instructions 235, thereby ensuring that all of the data 145 was securely erased from the storage media 140. For example, if the storage device 110 was requested to store data while it was still completing the execution of the invoked erase instructions 235, the storage device could respond to such a request with a "not ready" response, or analogous response, such as those well known by one of skill in the art, and could, thereby, not perform any access or change of data prior to completing the execution of the invoked erase instructions. The storage device 110, could, however respond to other types of requests, including, for example, providing indications, if so requested by a computing device, of the identity of the storage device, its current status, or how much of the storage device's current task was already completed, or remaining to be completed.

In another embodiment, rather than invoking existing instructions in a storage device's firmware 135, the card 170 can, when communicationally coupled to the storage device 110, provide, to the storage device, its own instructions that can be executed to enable the storage device to perform specific functions. For example, as shown in the storage system 300 of FIG. 3, the card 170 can comprise instructions 175 which can, in turn, comprise erase instructions 375. The erase instructions 375 can be erase instructions that are not part of the firmware 135, such as, for example, erase instructions that conform to a new secure erasure procedure or standard that was issued or announced after the manufacture of the storage device 110. When the card 170 is communicationally coupled to the storage device 110, the erase instructions 375 can be copied from the card 170 to the firmware 135 of the storage device 110 as erase instructions 376. Subsequently, as shown, other instructions 175 present on the card 170 can invoke the copied erase instructions 376, thereby causing their execution by the processing units or controllers 120, and thereby causing the storage device 110 to erase the data 145 from the storage media 140 in accordance with the new erase instructions 376.

Figure 3:
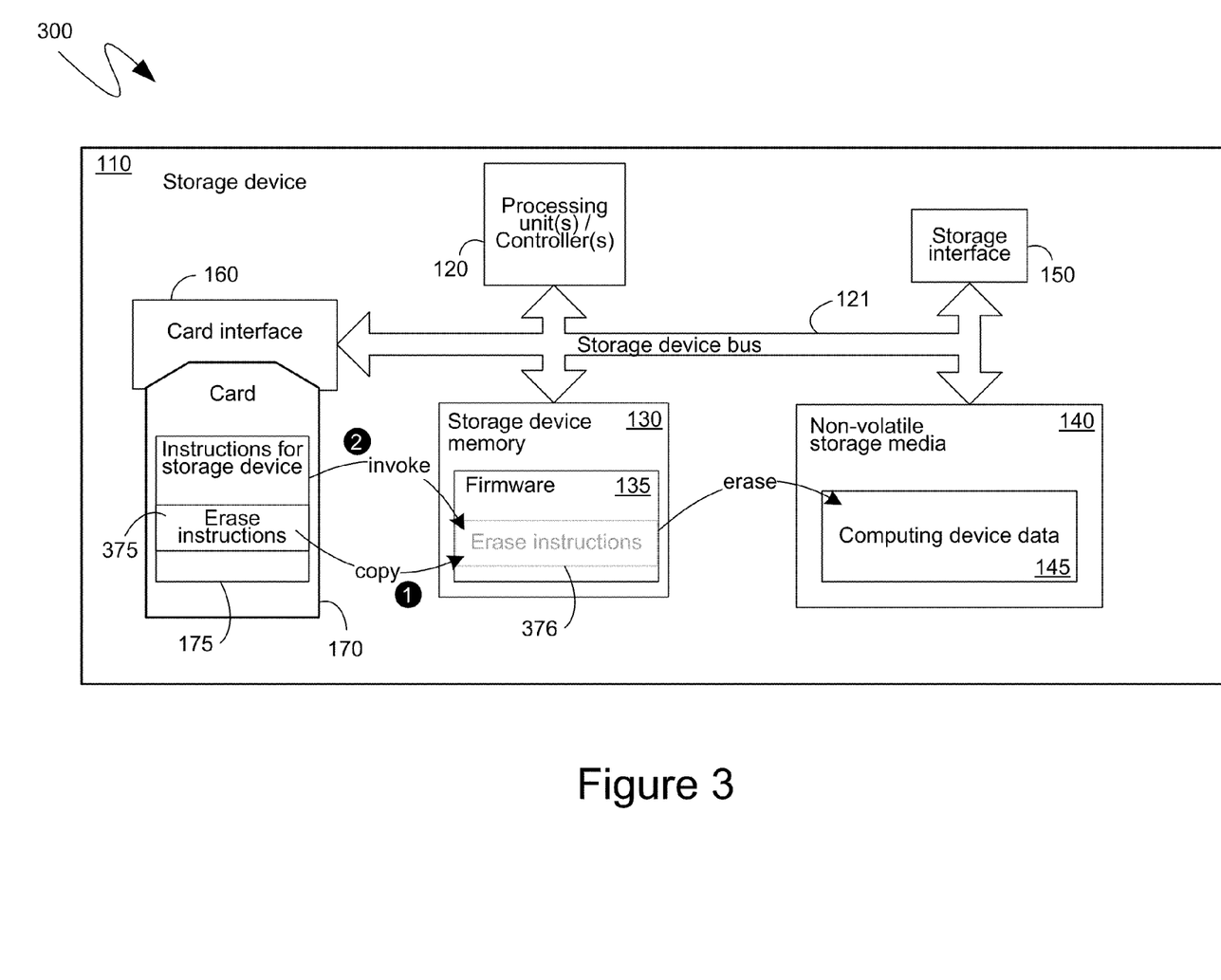
FIG. 3 is a block diagram of another exemplary operation of a storage device and a card communicationally coupled thereto.

By copying the erase instructions 375 to the firmware 135 of the storage device 110 as erase instructions 376, and then executing the erase instructions 376, the storage device can, as described above, continue to perform the erasure even after a loss, and subsequent reapplication of power. Similarly, the storage device 110 can, since the erase instructions 376 can be stored locally in the firmware 135, continue with the erasure operation even after the card 170 is communicationally disconnected from the storage device 110.

While the examples illustrated in FIGS. 2 and 3 have referenced erasure, since such a procedure can provide substantial benefits if it could be performed in an easy and simple manner without tying up a computing device, the described mechanisms are in no way limited only to erasure procedures. To the contrary, the above described mechanisms can be utilized to instruct storage devices to perform any number of actions that the storage devices can perform independently including, for example, maintenance actions, formatting actions, partitioning actions, free space erasure actions, and other actions. In one embodiment, an administrator of storage devices, such as the storage device 110, can be provided with multiple cards, such as the card 170, with each card configured to direct a storage device to perform a specific action. Thus, in such an embodiment, one card can be configured to direct a storage device to perform a simple erasure, another card can be configured to direct a storage device to perform a secure erasure, while yet another card can be configured to perform a formatting or partitioning action. Should a new secure erasure protocol be developed, the administrator can be provided with yet another card that can be configured to direct a storage device to perform a secure erasure in accordance with the newly developed protocol.

To avoid common human errors with respect to multiple cards, such as the card 170, configured to direct storage devices to perform differing actions, the cards can be visually, or otherwise physically, distinguishable. For example, cards directed to erasure tasks can be colored red, while cards directed to formatting tasks can be colored orange and cards directed to maintenance tasks can be colored yellow. Alternatively, or in addition, some cards, such as the card 170, can have a physical triggering device, such as a button, that can be pressed, engaged or otherwise activated to trigger whatever action the card will direct the storage device to perform. For example, erasure cards can have such a button, thereby preventing an accidental erasure of a storage device if the wrong card was accidentally communicationally coupled to the storage device. In yet another embodiment, the instruction of a storage device, such as the storage device 110, by a card, such as the card 170, can be delayed by a short amount of time to enable a user or administrator to realize their error and communicationally disconnect the card and the computing device. In such an embodiment, the copying of instructions from a card to a computing device, such as that described above with reference to the storage system 300 of FIG. 3, can occur immediately, but the subsequent invocation of the copied instructions can be delayed.

Figure 4:
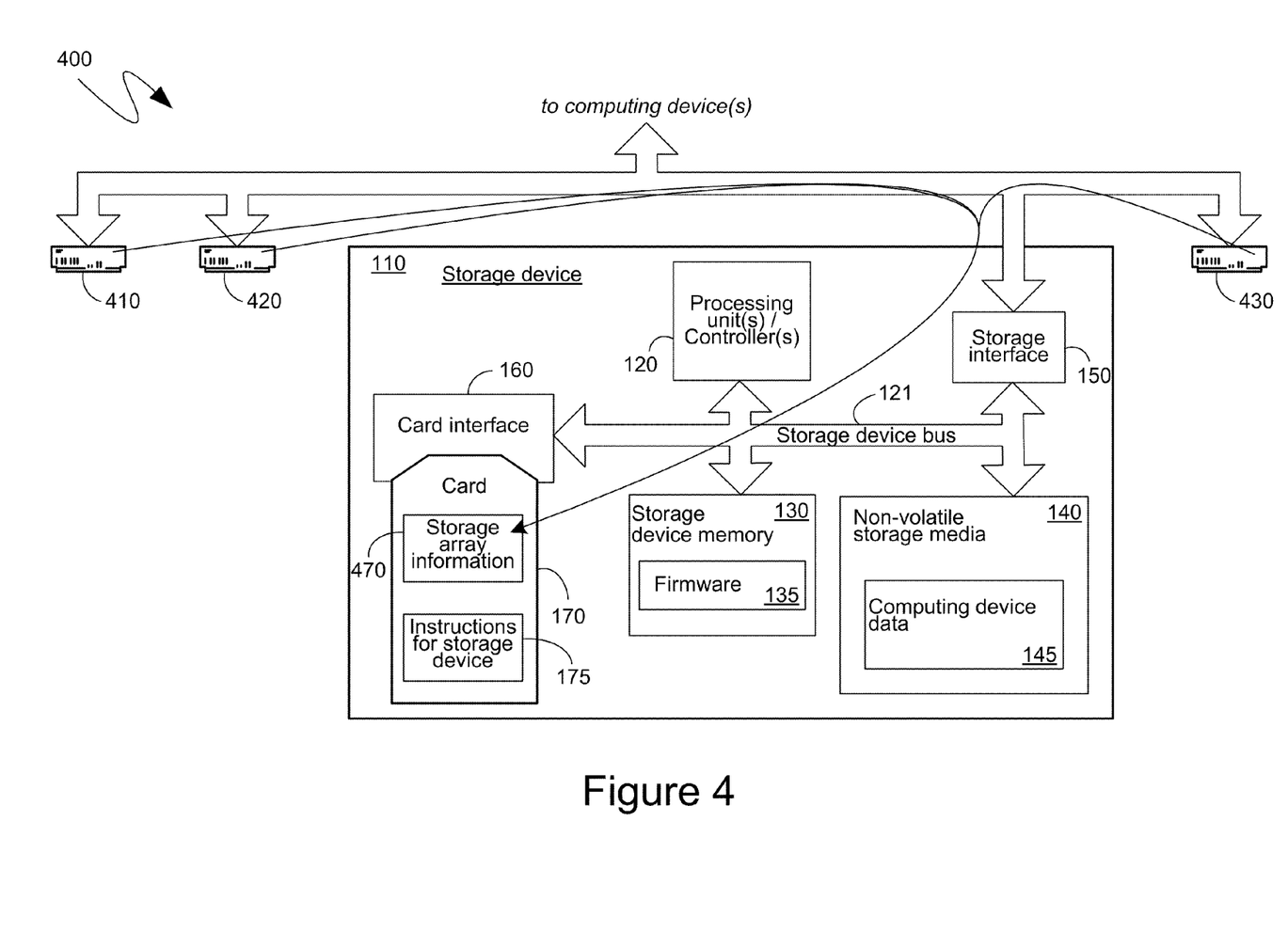
FIG. 4 is a block diagram of an exemplary operation of a storage device and a card communicationally coupled thereto within the context of a collection of storage devices.

In addition to instructions 175 that can direct a storage device, such as the storage device 110, to perform specific actions, the card 170 can further comprise other information or data relevant to the storage device. Turning to FIG. 4, an exemplary storage system 400 is shown comprising four storage devices, including the storage device 110. As shown, in the storage system 400, the storage device 110 can be communicationally connected to storage devices 410, 420 and 430 such that the storage system 400 provides for greater storage capacity, greater storage speed, greater storage protection, or combinations thereof, to one or more computing devices. For example, the storage devices 410, 420, 430 and 110 of the storage system 400 can be arranged in a Redundant Array of Inexpensive Disks (RAID) configuration. As will be known by those skilled in the art, certain RAID configurations provide for the redundant storage of data provided to the storage system 400, such that, should a storage device fail, the data provided to the storage system 400 can be wholly reconstructed.

Thus, in one embodiment, information regarding the storage system 400 can be stored by a storage device, such as the storage device 110, on the card 170 as the storage array information 470. Included in such storage array information 470 can be the identities and addresses, or other communicational information, of at least some of the other storage devices in the storage system 400. Also included in such storage array information 470 can be the relationship of the storage device 110 and, more specifically, of the data 145 stored on the storage media 140 of the storage device as related to the data provided to the storage system 400 and stored on the storage media of the other storage devices.

Figure 5:
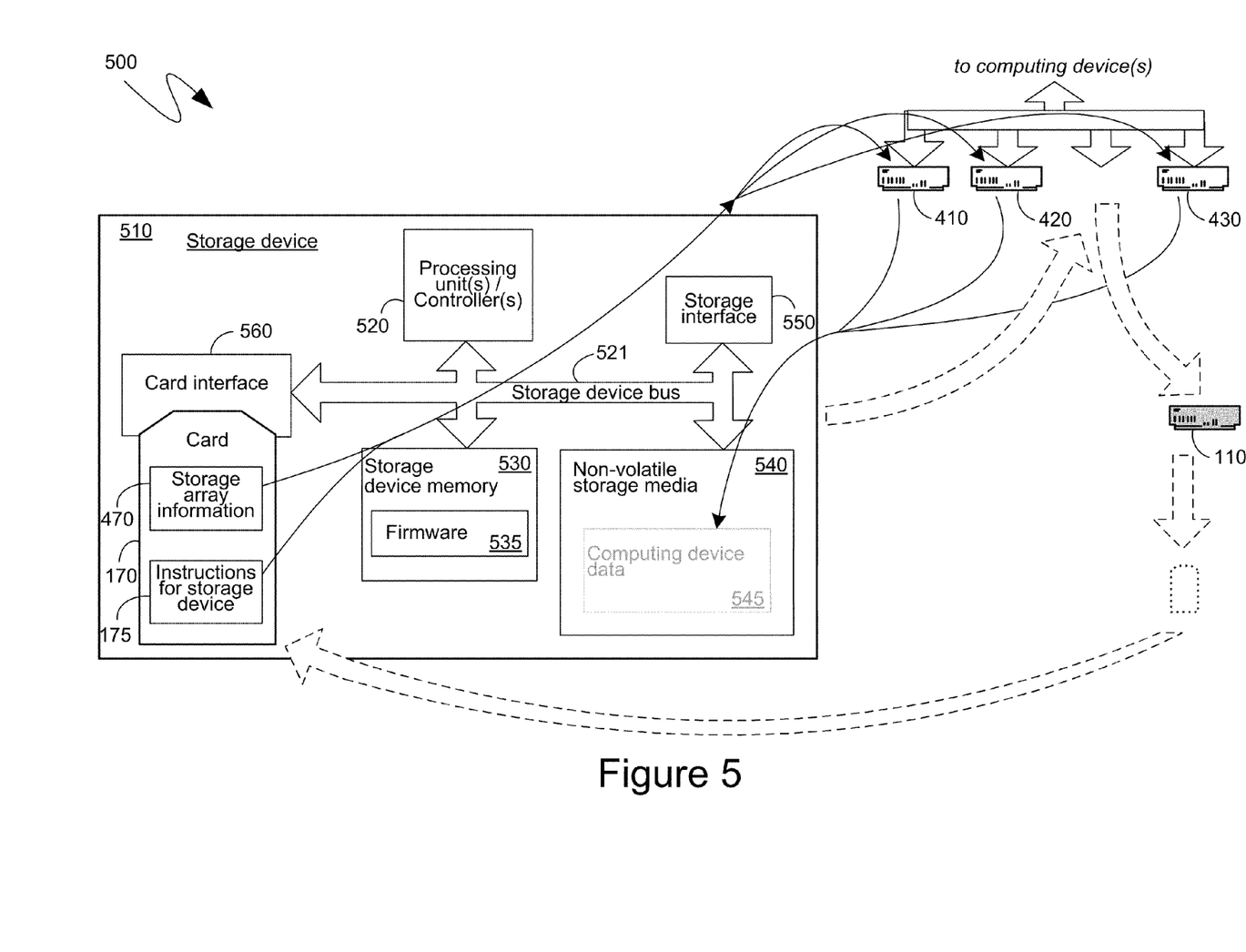
FIG. 5 is a block diagram of another exemplary operation of a storage device and a card communicationally coupled thereto within the context of a collection of storage devices.

In such an embodiment, should the storage device 110 fail, the card 170 can be communicationally disconnected from the storage device 110 and connected to a new storage device that is used to replace the storage device 110 in the storage system 400. Turning to FIG. 5, the storage system 500 illustrates such a scenario. As indicated by the shading in FIG. 5, the storage device 110 may have failed and, as a result, it can be communicationally disconnected from the storage array comprising the other storage devices 410, 420 and 430, as indicated by the dashed arrow. Subsequently, the card 170 can be communicationally disconnected from the storage device 110 and connected instead to the new storage device 510, as also indicated by the dashed arrows. For ease of description, the new storage device 510 can comprise processing units or controllers 520, storage device memory 530 with firmware 535, non-volatile storage media 540, a storage interface 550, and a card interface 560, all interconnected with a storage device bus 521, which can be analogous to the processing units or controllers 120, storage device memory 130 with firmware 135, non-volatile storage media 140, storage interface 150, card interface 160, and storage device bus 121 described in detail above.

The new storage device 510, communicationally coupled to the card 170 that was previously communicationally coupled to the storage device 110, can then be communicationally coupled to the storage array comprising the storage devices 410, 420 and 430. In one embodiment, as shown in FIG. 5, the instructions 175 of the card 170, in combination with the storage array information 470 stored on the card by the prior storage device 110, can enable the new storage device 510 to identify the utilization of the prior storage device 110 in the storage array and obtain, from the storage devices 410, 420 and 430 the data previously stored on the storage device 110, thereby returning redundancy to the storage array. Thus, as shown, the data 545 stored on the storage media 540 of the new storage device can be obtained from the storage devices 410, 420 and 430 based on the storage array information 470 previously provided to the card 170 by the storage device 110. In such an embodiment, new storage devices could integrate themselves into a storage array without burdening a computing device and without requiring an expensive storage array controller. Storage array functionality could, thereby, be pushed down to the lowest elements of the storage array; namely the storage devices themselves.

Figure 6:
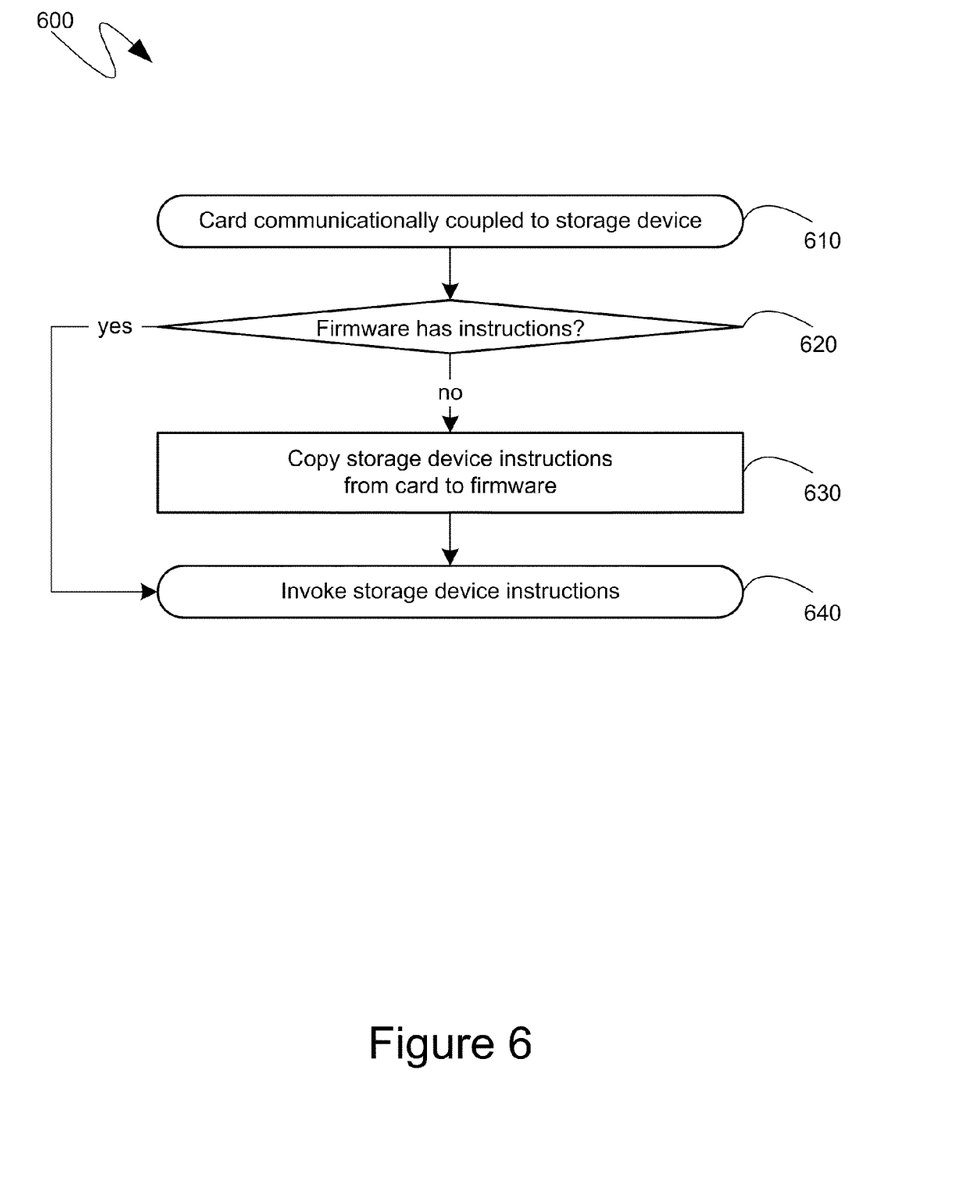
FIG. 6 is a flow diagram of an exemplary operation of a storage device and a card communicationally coupled thereto.

Turning to FIG. 6, a flow diagram illustrates an exemplary series of steps relevant to the utilization of a card, such as the card 170 illustrated and described above, to instruct and cause a storage device to perform specific actions. As shown, initially, at step 610, the card can be communicationally coupled to a storage device, which, as indicated previously can be through a physical or wireless connection. Subsequently, at step 620, a determination can be made regarding whether the firmware of the storage device to which the card was communicationally coupled already comprises the instructions that enable the storage device to perform the action which is to be initiated by the card. If, at step 620, it is determined that such instructions are not already present on the storage device's firmware, then at step 630, the relevant instructions can be copied from the card to the firmware. Subsequently, at step 640, instructions on the card can cause the invocation, or otherwise initiate the execution, of the relevant instructions from the firmware of the storage device, thereby causing the storage device to perform the action associated with the card. If, at step 620, it was determined that the relevant instructions were already present as part of the storage device's firmware, then processing can skip directly to the invocation of such instructions at step 640, as described.

Figure 7:
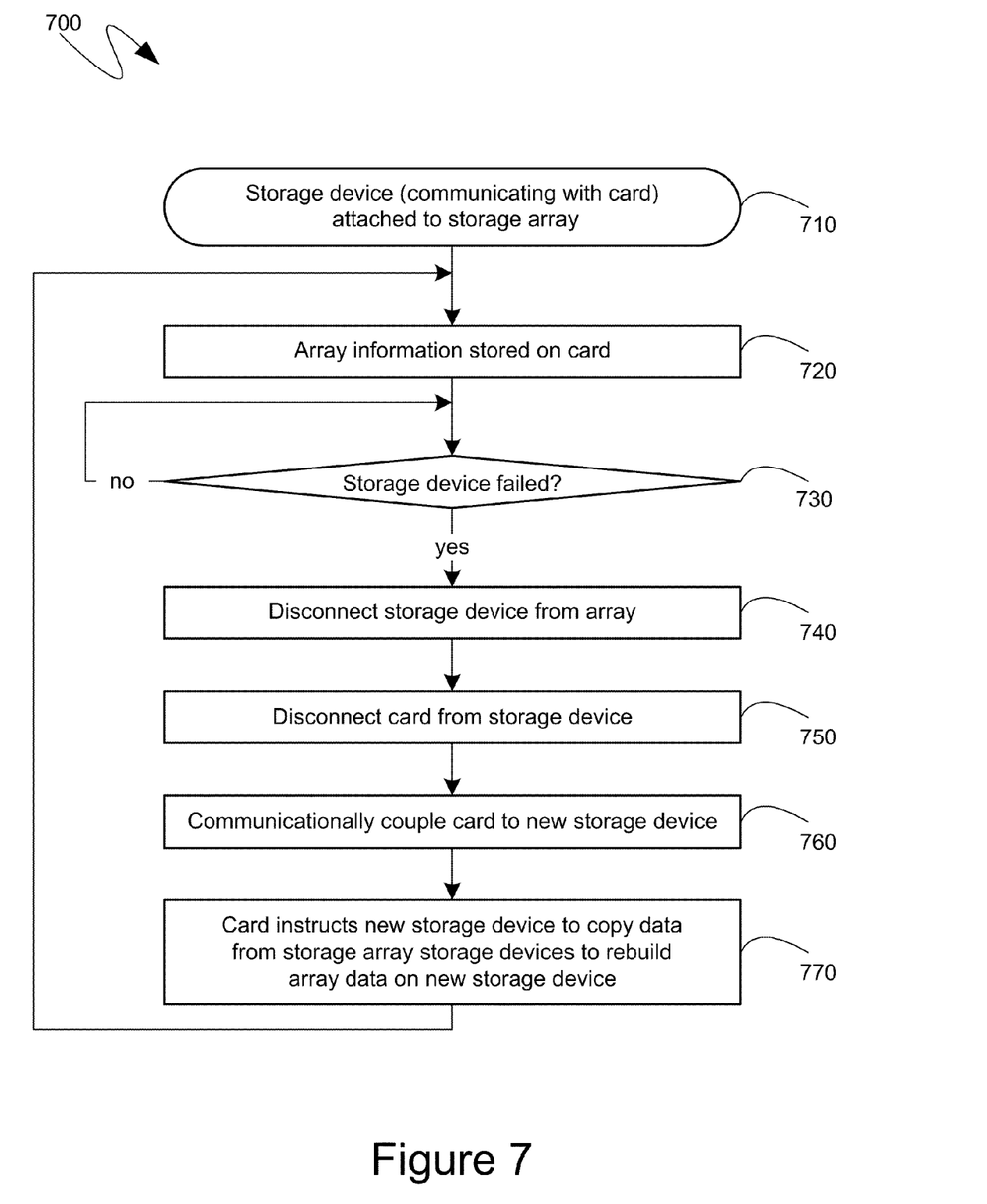
FIG. 7 is a flow diagram of another exemplary operation of a storage device and a card communicationally coupled thereto.

The flow diagram 700 of FIG. 7 illustrates an exemplary series of steps relevant to the utilization of a card, such as the card 170, to instruct and cause a storage device to perform actions specific to storage arrays or other collections of storage devices. Initially, at step 710, a card, such as the card 170, can be communicationally coupled to a storage device, such as the storage device 110, which is, in turn, part of a storage array or other collection of storage devices. Subsequently, at step 720, the storage device can store information on the card related to its association with the other storage devices of the storage array, and otherwise describing the information stored on the storage device with respect to the information stored on other storage devices. As described above, the information stored on the card by the storage device at step 720 should enable a new storage device, to which that card is subsequently communicationally coupled, to integrate itself into the storage array to the same extent as the storage device.

The storage device can, in addition to storing the relevant information on the card at step 720, operate in accordance with the array until it fails at step 730. Once the storage device has failed, or has otherwise become unsuitable for the storage array, at step 730, then, at step 740, that storage device can be communicationally disconnected from the storage array, and, at step 750, the card can be communicationally disconnected from the storage device. Subsequently, at step 760, the card can be communicationally coupled to a new storage device that is to take the place of the failed storage device in the storage array. At step 770, the card can, through the information stored thereon at step 720, and through instructions that can be present on the card or on the new storage device, direct the new storage device to obtain data, and other relevant information, from the existing storage devices to rebuild the data of the storage array into the same format and manner as it was prior to the failure of the old storage device. The new storage device can, thereby, through the performance of step 770, assume the place of the old storage device in the storage array without burdening a computing device and without requiring a storage array controller or similar device. Processing can then return to step 720, whereby new information regarding the storage array can be stored on the card by the new storage device, should the need arise.

As can be seen from the above descriptions, a card that can direct storage devices to perform stand-alone actions has been provided. In view of the many possible variations of the subject matter described herein, we claim as our invention all such embodiments as may come within the scope of the following claims and equivalents thereto.

We claim:

1. A method of causing storage devices that are capable of storing computer-readable information to perform at least one action while communicationally disconnected from a computing device, the method comprising the steps of:
   communicationally coupling, to a first storage device, a card that comprises card instructions and that is physically distinct from, and separable from, the first storage device, the first storage device being part of an array o storage devices;
   communicationally disconnecting the first storage device from the array of storage devices;
   communicationally disconnecting the card from the first storage device;
   communicationally connecting a second storage device that is different from and independent of the first storage device to the array of storage devices; and
   communicationally coupling the card to the second storage device, thereby causing the card instructions to invoke firmware instructions to be processed by at least one processing unit of the second storage device, the processing of the firmware instructions by the at least one processing unit causing the second storage device to reacquire computer-readable information previously stored on the first storage device from other storage devices of the array of storage device, wherein the second storage device comprises firmware comprising the firmware instructions.

2. The method of claim 1, wherein at least part of the invoked firmware instructions were stored on the firmware of the second storage device prior to the communicational coupling of the card to the second storage device.

3. The method of claim 1, wherein the card further comprises storage array information about the array of storage devices, the storage array information having been stored on the card by the first storage device.

4. The method of claim 1, wherein the communicationally coupling the card to the second storage device comprises establishing a wireless communicational connection between the card and the second storage device.

5. A storage device for storing computer-readable information, the storage device comprising:
   one or more computer-readable storage media having data stored thereon; one or more processing units;
   storage device memory comprising firmware instructions that are executable by the one or more processing units, the execution of which causes the storage device to perform at least one action, while communicationally disconnected from a computing device; and
   a card interface for communicationally coupling the storage device to a card that is physically distinct from, and separable from, the storage device, the card comprising card instructions for invoking the firmware instructions, such that they are executed by the one or more processing units, when the card is communicationally coupled to the storage device;
   wherein the at least one action comprises reconstructing, on the one or more computer-readable, media, data, from storage devices of a storage array, that was previously stored on another storage dev to which the card was previously communicationally connected, wherein the storage device replaces the other storage device in the storage array.

6. The storage device of claim 5, wherein the firmware instructions were stored on the storage device memory prior to the communicational coupling of the card to the storage device.

7. The storage device of claim 5, wherein the storage device memory comprises additional firmware instructions for storing, on the card, information associated with a storage array comprising the storage device.

8. The storage device of claim 5, wherein, once the firmware instructions are invoked b the card instructions, the storage device performs no other action directed to data storage until the at least one action is completed, irrespective of any intervening power in interruptions to the storage device and irrespective of any intervening communicational decoupling of the card from the storage device.

9. The storage device of claim 5, wherein the card interface is a wireless connection.

10. A card that is physically distinct from, and separable from, a storage device, the card comprising:
    at least one communicational interface;
    card instructions that invoke firmware instructions to be processed by at least one processing unit of the storage device, while the storage device is communicationally disconnected from a computing device, the processing of the firmware instructions by the at least one processing unit causing the storage device to reacquire computer-readable information previously stored on a prior storage device from other storage devices of an array of storage devices of which the storage device is a part; and
    storage array information about the array of storage devices, the storage array information having been stored on the card by the prior storage device;
    wherein the storage device comprises firmware comprising the firmware instructions; and
    wherein further the card comprises a physical connecting structure or shape.

11. The card of claim 10, wherein at least part of the invoked firmware instructions were stored on the firmware of the storage device prior to a communicational coupling of the card to the storage device.

12. The card of claim 10, further comprising a physical triggering device for initiating the invocation of the firmware instructions by the card instructions.

13. The method of claim 1, wherein once the firmware instructions are invoked by the card instructions, the second storage device performs no other action directed to data storage until the reacquiring the computer-readable information is completed, irrespective of any intervening power interruptions to the second storage device and irrespective of any intervening communicational decoupling of the card from the second storage device.

14. The method of claim 3, wherein the storage array information identifies how the first storage device was utilized within the array of storage devices and comprises communicational information for other storage devices of the array of storage devices.

15. The storage device of claim 5, wherein the storage device memory comprises a second set of firmware instructions that delay, after being invoked by the card instructions, the execution of the firmware instructions that cause the performance of the at least one action, and wherein further, if the card is communicationally disconnected from the storage device during the delay, the execution of the firmware instructions causing the performance of the at least one action is cancelled.

16. The storage device of claim 7, wherein the information stored on the card by the additional firmware instructions identifies how the storage device was utilized within the storage array and comprises communicational information for other storage devices of the storage array.

17. The card of claim 10, further comprising an exterior color to distinguish the card from other cards comprising card instructions that cause storage devices to perform other actions.

18. The storage device of claim 7, wherein once the firmware instructions are invoked by the card instructions, the storage device performs no other action directed to data storage until the reacquiring the computer-readable information is completed, irrespective of any intervening power interruptions to the storage device and irrespective of any intervening communicational decoupling of the card from the storage device.

19. The storage device of claim 7, wherein the storage array information identifies how the prior storage device was utilized within the array of storage devices and comprises communicational information for other storage devices of the array of storage devices.

* * * * *